(12) United States Patent
Hastings

(10) Patent No.: US 10,199,932 B1
(45) Date of Patent: Feb. 5, 2019

(54) PRECHARGE CIRCUIT USING NON-REGULATING OUTPUT OF AN AMPLIFIER

(71) Applicant: TEXAS INSTRUMENTS INCORPORATED, Dallas, TX (US)

(72) Inventor: Roy Alan Hastings, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/730,823

(22) Filed: Oct. 12, 2017

(51) Int. Cl.
*H02M 3/07* (2006.01)
*G05F 3/24* (2006.01)
*G05F 1/575* (2006.01)
*G05F 1/46* (2006.01)

(52) U.S. Cl.
CPC .............. *H02M 3/07* (2013.01); *G05F 1/468* (2013.01); *G05F 1/575* (2013.01); *G05F 3/247* (2013.01)

(58) Field of Classification Search
CPC .......... G05F 1/468; G05F 1/575; G05F 3/247; H02M 3/07
See application file for complete search history.

(56) References Cited

U.S. PATENT DOCUMENTS

| | | | | |
|---|---|---|---|---|
| 9,960,782 | B2* | 5/2018 | Stulik | H02M 3/07 |
| 2004/0228152 | A1* | 11/2004 | Solie | H02M 1/36 363/49 |
| 2005/0002218 | A1* | 1/2005 | Nazarian | G11C 11/16 365/148 |
| 2016/0291620 | A1* | 10/2016 | Zhou | G05F 1/575 |

* cited by examiner

*Primary Examiner* — Kyle J Moody
*Assistant Examiner* — Lakaisha Jackson
(74) *Attorney, Agent, or Firm* — Tuenlap Chan; Charles A. Brill; Frank D. Cimino

(57) ABSTRACT

A reference signal generator includes a voltage reference, an amplifier coupled to the voltage reference, and a precharge circuit coupled to the amplifier. The voltage reference is configured to generate a constant voltage. The amplifier is configured to receive the constant voltage from the voltage reference and generate a regulating primary output signal and a non-regulating secondary output signal. The precharge circuit is configured to charge a noise reduction capacitor with the non-regulating secondary output signal.

20 Claims, 3 Drawing Sheets

US 10,199,932 B1

PRECHARGE CIRCUIT USING NON-REGULATING OUTPUT OF AN AMPLIFIER

BACKGROUND

Linear voltage regulators are used in many electronic devices to maintain a constant voltage to drive a load. Because the load may vary, the resistance of the regulator varies based on the load so that a constant voltage is produced. One type of linear voltage regulator is a low-dropout (LDO) regulator. LDO regulators are configured to regulate voltage even if the supply voltage is close to the regulated output voltage. LDO regulators include a differential amplifier that drives a power transistor. One input of the differential amplifier is a reference voltage generated by a voltage reference (e.g., a bandgap reference, a Zener diode, etc.). The second input of the differential amplifier is a fraction of the output voltage of the LDO regulator. Thus, the drive voltage to the power transistor changes to regulate the output voltage based on the value of the output voltage itself. In other words, if the output voltage rises relative to the reference voltage, the drive voltage powering the power transistor also changes to maintain an output voltage that remains constant.

SUMMARY

In accordance with at least one embodiment of the disclosure, a reference signal generator includes a voltage reference, an amplifier coupled to the voltage reference, and a precharge circuit coupled to the amplifier. The voltage reference is configured to generate a constant voltage. The amplifier is configured to receive the constant voltage from the voltage reference and generate a regulating primary output signal and a non-regulating secondary output signal. The precharge circuit is configured to charge a noise reduction capacitor with the non-regulating secondary output signal.

Another illustrative embodiment is a precharge circuit that includes a capacitor charging circuit, a reference signal generation circuit, and a control circuit. The capacitor charging circuit is configured to charge a noise reduction capacitor with a non-regulating secondary output signal received from an amplifier. The reference signal generation circuit is configured to generate a reference signal based on a regulating primary output signal received from the amplifier. The control circuit is configured to enable and disable the non-regulating secondary output signal.

Yet another illustrative embodiment is a method for generating a reference signal. The method includes generating, by an amplifier, a regulating primary output signal. The method also includes generating, by the amplifier, a non-regulating secondary output signal. The method also includes charging a noise reduction capacitor with the non-regulating secondary output signal. The method also includes generating a reference signal with the regulating primary output signal.

BRIEF DESCRIPTION OF THE DRAWINGS

For a detailed description of various examples, reference will now be made to the accompanying drawings in which.

NOTATION AND NOMENCLATURE

Figure 1:
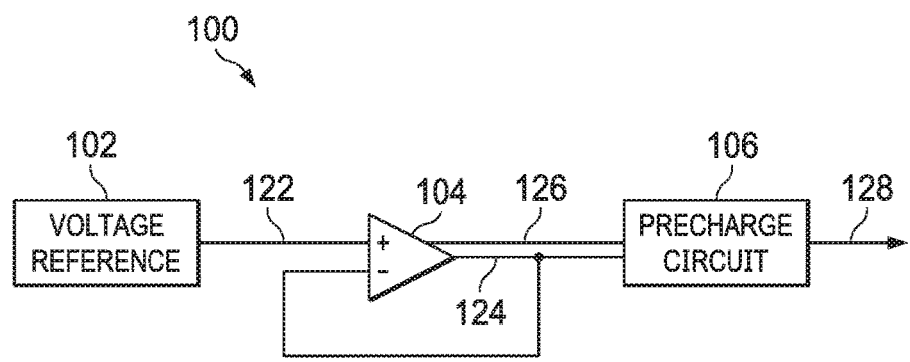
FIG. 1 shows an illustrative block diagram of a reference signal generator in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Linear voltage regulators are used in many electronic devices to maintain a constant voltage to drive a load. Because the load may vary, the resistance of the regulator varies based on the load, so that a constant voltage is produced. As discussed above, one type of linear voltage regulator is a LDO regulator which includes a differential amplifier that compares a reference voltage to the output voltage to drive a power transistor, thus, regulating the output voltage.

Although linear regulators do not generate switching noise, they do include device noise. Device noise is an unavoidable consequence of the quantum nature of charge carriers. Device noise varies with frequency, so it is usually analyzed in terms of noise spectral density. In many datasheets, the root-mean-square (RMS) noise voltage over a specific band of frequencies (e.g., 10 Hz-100 kHz) is specified. To generate the reference voltage, linear regulators use a voltage reference (e.g., a bandpass reference, a Zener diode, etc.). However, these voltage references suffer from flicker noise (e.g., 1/f noise). The noise spectral density of flicker noise varies inversely with frequency and typically dominates the noise in the RMS noise voltage. Flicker noise can be suppressed with a resistor-capacitor (RC) filter; however, for best results, the corner frequency of the RC filter should be at least an order of magnitude beneath the lower edge of the bandwidth of interest. For example, if the RMS noise voltage is between 10 Hz and 100 kHz, the RC filter corner frequency should be no greater than 1 Hz. Thus, the capacitor in the RC filter needs to be relatively large, and in many cases, cannot be onboard with the voltage reference and the RC filter resistor. Due to the size of the capacitor, the settling time of such an RC filter is objectionably large (e.g., several seconds) unless a precharge circuit is utilized to precharge the capacitor (known as a noise reduction capacitor).

One conventional precharge circuit bypasses a filter resistor with a switch. When the switch is closed, the noise reduction capacitor is precharged with a relatively large current through the switch. Once the precharge period is complete, the switch is opened, and the output voltage of the voltage reference is filtered by the filter resistor and the noise reduction capacitor. However, this type of conventional precharge circuit causes voltage droops in the voltage reference during the precharge period. In other words, precharging the noise reduction capacitor causes the voltage reference to collapse. Because the voltage reference may provide a reference voltage to other circuitry, the voltage droop caused by precharging the noise reduction capacitor is unacceptable. To cure this deficiency, some conventional precharge circuits include a buffer amplifier between the voltage reference and the noise reduction filter (e.g., the filter resistor and noise reduction capacitor). While this does solve some of the problems discussed above (e.g., prevents the collapse in the voltage reference), other problems arise. For example, while many linear regulators include the external noise reduction capacitor, the regulator is also expected to work without this capacitor. Therefore, in this configuration, the buffer amplifier must be internally compensated, which can be difficult to design. Furthermore, in some systems, the buffer amplifier itself can be used to provide a voltage to other circuitry, thus, the voltage droop in the output signal generated by the amplifier caused by precharging the noise reduction capacitor in such configurations, is unacceptable. Therefore, there is a need for a reference signal generator that does not cause the droop in the voltage generated by the voltage reference itself and/or the voltage generated by the buffer amplifier and still precharges the noise reduction capacitor to provide filtering of the reference voltage generated by the circuit.

In accordance with various examples, a reference signal generator is provided that precharges a noise reduction capacitor while preventing voltage droop in the outputs of the voltage reference and/or the buffer amplifier. The buffer amplifier is configured to generate a regulating primary output signal for use in generating the reference voltage and as the negative feedback for the amplifier. The buffer amplifier is also configured to generate a non-regulating secondary output signal at a voltage which tracks the voltage of the regulating primary output signal. In other words, the amplifier generates a parasitic parallel output voltage to the regulating primary output signal. The non-regulating secondary output signal acts to precharge the noise reduction capacitor without affecting the regulating primary output signal. Once the noise reduction capacitor is charged, the non-regulating secondary output signal can be disabled. The noise reduction capacitor along with a filter resistor act as an RC filter to reduce noise in the regulating primary output signal and generate the reference voltage with a reduced amount of noise. Because the regulating primary output signal is not used to charge the noise reduction capacitor, there is no voltage droop in that output. Therefore the regulating primary output can also be utilized by any circuitry at any time, including while the noise reduction capacitor is being precharged. Once the precharge is complete, the filtered regulating primary output signal is then output as the reference voltage.

FIG. 1 shows an illustrative block diagram of a reference signal generator 100 in accordance with various examples. The reference signal generator 100 includes, in an embodiment, a voltage reference 102, a buffer amplifier 104, and a precharge circuit 106. The voltage reference 102 is coupled to the buffer amplifier 104 which is coupled to the precharge circuit 106. The voltage reference 102 is configured to generate a constant voltage signal 122. The voltage reference 102 is, in an embodiment, a bandpass reference; however, in alternative embodiments, the voltage reference 102 can be any type of voltage reference (e.g., a Zener diode). The amplifier 104 is configured to receive the constant voltage signal 122 from the voltage reference 102 and generate a regulating primary output signal 124 and a non-regulating secondary output signal 126. The regulating primary output signal 124 acts, in an embodiment, as the negative feedback signal for the amplifier 104. The non-regulating secondary output signal 126 can act as a parasitic parallel output voltage that tracks the voltage of the regulating primary output signal 124.

The precharge circuit 106 is configured to receive the regulating primary output signal 124 and the non-regulating secondary output signal 126. The precharge circuit 106 is also configured to charge a noise reduction capacitor, which, in some embodiments, is a part of the precharge circuit 106, with the non-regulating secondary output signal 126. The precharge circuit 106 can enable and disable the non-regulating secondary output signal 126. For example, the precharge circuit 106 can enable the non-regulating secondary output signal 126 to precharge the noise reduction capacitor, and, once the noise reduction capacitor is charged, disable the non-regulating secondary output signal 126. Once the noise reduction capacitor is charged, the precharge circuit 106 generates reference signal 128 by, in some embodiments, filtering the regulating primary output signal 124 with the noise reduction capacitor and a filter resistor, together acting as an RC filter. The reference signal 128 then can act as a voltage reference for one or more circuits (e.g., the voltage reference of a differential amplifier as part of a LDO regulator).

Figure 2:
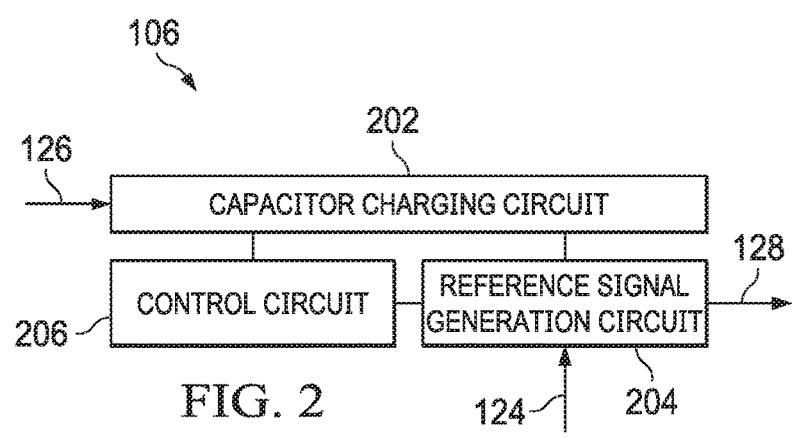
FIG. 2 shows an illustrative block diagram of a precharge circuit in a reference signal generator in accordance with various examples.

FIG. 2 shows an illustrative block diagram of precharge circuit 106 in reference signal generator 100 in accordance with various examples. The precharge circuit 106, in an embodiment, includes capacitor charging circuit 202, reference signal generation circuit 204, and control circuit 206. The capacitor charging circuit 106 is configured to receive the non-regulating secondary output 126 and charge the noise reduction capacitor with the non-regulating secondary output 126. The reference signal generation circuit is configured to generate the reference signal 128 based on the received regulating primary output 124. The control circuit 206 is configured to enable and/or disable the non-regulating secondary output signal 126. In some embodiments, the control circuit 206 is configured to disable the non-regulating secondary output signal 126 in response to a determination that the noise reduction capacitor is charged by the non-regulating secondary output 126.

Figure 3:
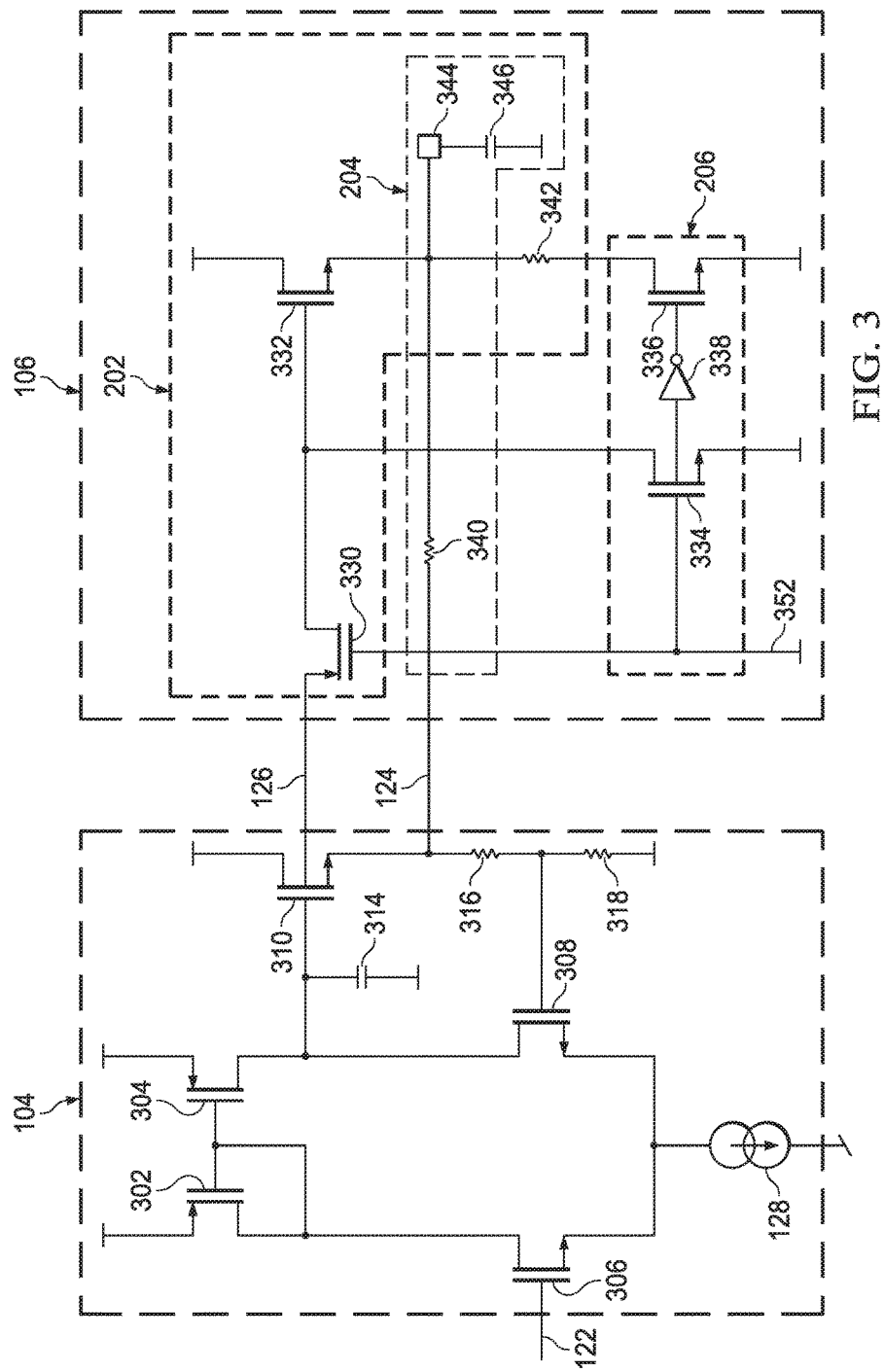
FIG. 3 shows an illustrative circuit diagram for an amplifier and precharge circuit in a reference signal generator in accordance with various examples.

FIG. 3 shows an illustrative circuit diagram for amplifier 104 and precharge circuit 106 in reference signal generator 100 in accordance with various examples. The example amplifier 104 shown in FIG. 3, includes transistors 302-310, a resistor divider that comprises resistors 316-318, and an internal compensation capacitor 314. Although, shown in FIG. 3 as a low-current transistor amplifier stabilized by the internal compensation capacitor 314, in other embodiments, the amplifier 104 can be designed with alternative components and/or connections (e.g., a cascode amplifier, etc.). As discussed above, the precharge circuit 106 includes, in an embodiment, capacitor charging circuit 202, reference signal generation circuit 204, and control circuit 206. The capacitor charging circuit 202 can include the transistors the transistors 330-332, the load resistor 342, and the noise reduction capacitor 346, which may be connected to the remaining components of the capacitor charging circuit 202 through pin 344. The reference signal generation circuit 204 can include the filter resistor 340 and the noise reduction capacitor 346 connected together in series through, in some embodiments, pin 344. The control circuit 206 can include transistors 334-336, and inverter 338. While the transistors 302-310 and 330-336 are depicted as metal-oxide-semiconductor field-effect transistors (MOSFETs) in FIG. 3, they can be any type of transistor, including bipolar junction transistors (BJTs).

The amplifier 104 depicted in FIG. 3 is highly stable because the filter resistor 340 from the reference signal generation circuit 204 decouples the noise reduction capacitor 346 from the amplifier 104, thus, allowing the internal compensation capacitor 314 to provide dominant pole compensation regardless of whether the noise reduction capacitor 346 is present or not. The output at the source of transistor 310, which in some embodiments is an n-channel MOSFET, is the regulating primary output signal 126. The negative feedback loop of the amplifier 106 is closed through the resistor divider consisting of resistors 316-318 which attenuates the regulating primary output signal 126, and thus, the reference signal 128 to match the constant voltage signal 122 generated by the voltage reference 102. Additionally, this arrangement enables the amplifier 104 to generate a reference signal 128 that has a larger voltage than the constant voltage signal 122 which can be desirable in linear regulators because the reference signal 122 can be scaled to equal the desired output voltage of the regulator to eliminate the need for a noisy resistor divider within the regulator itself. The noise generated by the resistor divider consisting of resistors 316-318 is significantly reduced, and in some embodiments, effectively eliminated, by the RC filter in the reference signal generation circuit 204 which, when the noise reduction capacitor 346 is charged, filters the regulating primary output signal 126 to generate the reference signal 128. Therefore, scaling the reference signal 128 in this manner reduces the overall device noise in the system (e.g., the regulator).

The resistance value of the resistance divider comprising resistors 316-318 is set, in an embodiment, based on the amount of bias current that is desired (or acceptable) to be generated and/or wasted. For example, if a very small amount of bias current can be wasted, the summation of the resistance value of resistors 316 and 318 may be very large (e.g., multiple MΩs). While the resistor divider shown in FIG. 3 includes two resistors, in some embodiments resistor 316 is not present and/or the resistance value of resistor 316 is set to 0.

To precharge the noise reduction capacitor 346, the signal 352 causes the transistor 330 (acting as a switch) to close (turn on). As shown, in FIG. 3, the transistor 330 is a p-channel MOSFET; therefore, the signal 352 is driven LOW closing the transistor 330. When the transistor 330 is closed, transistor 332, which in some embodiments is an n-channel MOSFET, is connected to the amplifier 104, and more specifically the gate of transistor 310. Transistor 332 acts as an open-loop output that directly drives (precharges) the noise compensation capacitor 346. In other words, because the gate of transistor 332 is connected directly to the gate of transistor 310 when the transistor 330 is closed, a parasitic output, the non-regulating secondary output signal 126, is formed parallel to the regulating primary output signal 124. Therefore, closing the transistor 330 enables the non-regulating secondary output signal 126. Because the feedback loop of the amplifier 104 is closed from transistor 310, through the resistor divider consisting of resistor 316-318, and not from transistor 332, the closing of transistor 330 does not upset the stability of the amplifier 104.

While the noise reduction capacitor 346 is being precharged, the load resistor 342 provides a load on transistor 332. If transistor 332 is the same size as transistor 310, then resistor 342 is configured to have the same resistance as the sum of resistors 316 and 318. If the width of transistor 332 is different (e.g., wider) than the width of transistor 310, the resistance of the load resistor 342 is configured, in an embodiment, according to: $R_{342}=W_{310}/W_{332} (R_{316}+R_{318})$ where $R_{342}$ is the resistance of load resistor 342, $R_{316}$ is the resistance of resistor 316, $R_{318}$ is the resistance of resistor 318, $W_{310}$ is the width of transistor 310, and $W_{332}$ is the width of transistor 332. In this way, the final gate-to-source voltage drop of transistor 332 (after the noise reduction capacitor 346 is charged) will equal the gate-to-source voltage of transistor 310. In other words, load resistor 342 provides the same or nearly the same load on transistor 332 as the load the resistor divider made up of resistors 316-318 provides to transistor 310. Therefore, transistor 332 has the approximately the same current draw through it as the current draw through transistor 310. In this way, the voltage of the non-regulating secondary output signal 126 tracks the voltage of the regulating primary output signal 124. Thus, the voltage to which the noise reduction capacitor 346 settles during precharge is the same as the voltage at which it will operate when precharge terminates.

Once the noise reduction capacitor 346 is charged, the control circuit 206, through the signal 352, is configured to open (turn off) the transistor 330. In other words, a HIGH signal 352 drives the gate of transistor 330 opening the transistor 330. This causes the amplifier 104 to stop generating the non-regulating secondary output signal 126 (i.e., disables the non-regulating secondary output signal 126). The RC filter formed by the filter resistor 340 and the noise reduction capacitor 346, then acts to filter the regulating primary output signal 124 to generate the reference signal 128 as discussed above. The filter resistor 340 has, in an embodiment, a resistance value based on the amount of pin leakage from pin 344, and thus, in some embodiments a maximum resistance value of 100 kn. For example, if the leakage current of the pin 344 is 0.1 μA and the resistance value of filter resistor 340 is 1 MΩ, then the voltage drop is 100 mV which is unacceptable. However, if the resistance value of the filter resistor 340 is 100 kΩ, then the voltage drop is 10 mV which may be tolerable in certain applications. If the pin leakage current of the pin 344 is very low (e.g., 0.02 μA), then higher resistance values are available for the filter resistor 340 (e.g., 1 MΩ).

Figure 4:
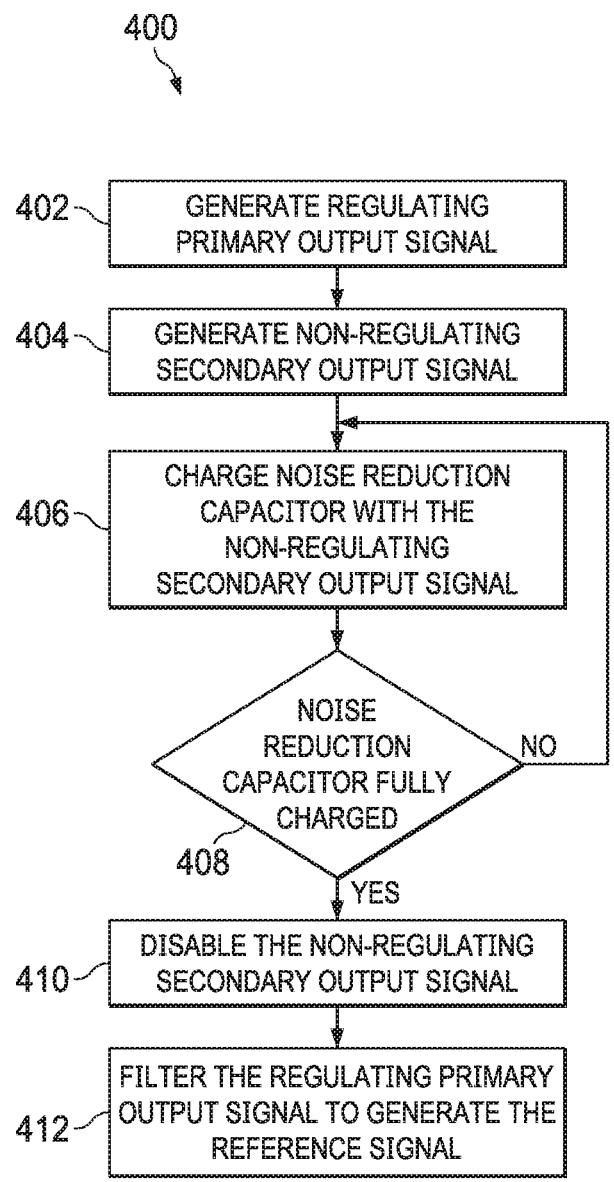
FIG. 4 shows an illustrative flow diagram of a method for generating a reference signal in accordance with various examples.

FIG. 4 shows an illustrative flow diagram of a method 400 for generating a reference signal in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 400, as well as other operations described herein, are performed by the voltage reference 102, the amplifier 104, and/or the precharge circuit (including the capacitor charging circuit 202, the reference signal generation circuit 204, and/or the control circuit 206) and implemented in logic.

The method 400 begins in block 402 with generating a regulating primary output signal. For example, the buffer amplifier 104 is configured to receive constant voltage signal 122 and generate regulating primary output signal 124, which, in some embodiments, is an amplified version of the constant voltage signal 122. The regulating primary output signal 124 is also used as the negative feedback input to the amplifier 124. In block 404, the method 400 continues with generating a non-regulating secondary output signal. For example, in addition to generating the regulating primary output signal 124, the amplifier 104 is also configured to generate non-regulating secondary output signal 126 with a voltage which tracks the voltage of the regulating primary output signal 124. In other words, the amplifier 104 generates a parallel parasitic voltage that tracks the voltage of the regulating primary output signal 124.

The method 400 continues in block 406 with charging a noise reduction capacitor with the non-regulating secondary output signal. For example capacitor charging circuit 202 is configured to charge the noise reduction capacitor 346. In block 408, the method 400 continues with determining whether the noise reduction capacitor is fully charged. If, in block 408, a determination is made that the noise reduction capacitor is not fully charged, the method 400 continues in block 406 with continuing to charge the noise reduction capacitor with the non-regulating secondary output signal.

However, if, in block 408, a determination is made that the noise reduction capacitor is fully charged, the method 400 continues in block 410 with disabling the non-regulating secondary output signal. For example, the control circuit 206 is configured to disable the non-regulating secondary output signal by, in some embodiments, driving the gate of transistor 330 to turn it off.

In block 412, the method 400 continues with filtering the regulating primary output signal to generate a reference signal. For example, the noise reduction capacitor 346 in conjunction with a series filter resistor 340 filter the regulating primary output signal 124 to generate the reference signal 128.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A reference signal generator, comprising:
   a voltage reference configured to generate a constant voltage;
   an amplifier coupled to the voltage reference, the amplifier configured to receive the constant voltage from the voltage reference and generate a regulating primary output signal and a non-regulating secondary output signal; and
   a precharge circuit coupled to the amplifier, the precharge circuit configured to charge a noise reduction capacitor with the non-regulating secondary output signal.

2. The reference signal generator of claim 1, wherein the precharge circuit is further configured to enable and disable the non-regulating secondary output signal.

3. The reference signal generator of claim 2, wherein the precharge circuit is further configured to enable the non-regulating secondary output signal to charge the noise reduction capacitor, and in response to the noise reduction capacitor being charged, disable the non-regulating secondary output signal.

4. The reference signal generator of claim 3, wherein the precharge circuit includes a switch and a control circuit, the control circuit configured to:
   close the switch to enable the non-regulating secondary output signal to charge the noise reduction capacitor; and
   open the switch to disable the non-regulating secondary output signal.

5. The reference signal generator of claim 4, wherein the switch is a p-channel metal-oxide-semiconductor field-effect transistor (MOSFET).

6. The reference signal generator of claim 1, wherein the precharge circuit is further configured to receive the regulating primary output signal and generate a reference signal.

7. The reference signal generator of claim 6, wherein the precharge circuit includes a resistor in series with the noise reduction capacitor, the resistor and noise reduction capacitor configured to filter the regulating primary output signal to generate the reference signal.

8. The reference signal generator of claim 1, wherein a voltage of the non-regulating secondary output signal tracks a voltage of the regulating primary output signal.

9. A precharge circuit, comprising:
   a capacitor charging circuit configured to charge a noise reduction capacitor with a non-regulating secondary output signal received from an amplifier;
   a reference signal generation circuit configured to generate a reference signal based on a regulating primary output signal received from the amplifier; and
   control circuit configured to enable and disable the non-regulating secondary output signal.

10. The precharge circuit of claim 9, further comprising a first resistor in series with the noise reduction capacitor, the resistor and noise reduction capacitor configured to filter the regulating primary output signal to generate the reference signal.

11. The precharge circuit of claim 9, wherein the capacitor charging circuit includes a first switch configured to, when closed, enable the non-regulating secondary output signal to charge the noise reduction capacitor and, when open, disable the non-regulating secondary output signal.

12. The precharge circuit of claim 11, further comprising a first resistor in series with the noise reduction capacitor, the resistor and noise reduction capacitor configured to, in response to the first switch being open, filter the regulating primary output signal to generate the reference signal.

13. The precharge circuit of claim 11, wherein the capacitor charging circuit further includes a second switch connected to the first switch, the second switch configured to, in response to the first switch being closed, drive the noise reduction capacitor.

14. The precharge circuit of claim 13, wherein the capacitor charging circuit further includes a first load resistor connected to the second switch, the first load resistor configured to provide a load to the non-regulating secondary output signal so that the non-regulating secondary output signal tracks the regulating primary output signal.

15. The precharge circuit of claim 14, wherein the first switch is a p-channel metal-oxide-semiconductor field-effect transistor (MOSFET) and the second switch is an n-channel MOSFET.

16. The precharge circuit of claim 15, wherein:
- the first switch includes a first drain, a first source, and a first gate;
- the second switch includes a second drain, a second source, and a second gate;
- the first source is connected to a gate of an amplifier transistor included in the amplifier;
- the first drain is connected to the second gate; and
- the second source is connected to the noise reduction capacitor.

17. The precharge circuit of claim 16, wherein the second source is further connected to the first load resistor.

18. The precharge circuit of claim 16, wherein the reference signal generation circuit includes a second load resistor connected to a source of the amplifier transistor and the noise reduction capacitor.

19. A method for generating a reference signal, comprising:
- generating, by an amplifier, a regulating primary output signal;
- generating, by the amplifier, a non-regulating secondary output signal;
- charging a noise reduction capacitor with the non-regulating secondary output signal; and
- generating a reference signal with the regulating primary output signal.

20. The method of claim 19, further comprising:
- in response to a determination that the noise reduction capacitor is charged, disabling the non-regulating secondary output signal; and
- filtering the regulating primary output signal.

* * * * *